United States Patent
Wang (10) Patent No.: US 11,368,286 B1
(45) Date of Patent: Jun. 21, 2022

(54) TXILM: LOSSY BLOCK COMPRESSION WITH SALTED SHORT HASHING

(71) Applicant: Jiaping Wang, Redmond, WA (US)

(72) Inventor: Jiaping Wang, Redmond, WA (US)

(73) Assignee: Jiaping Wang, Redmond, WA (US)

( * ) Notice: Subject to any disclaimer, the term of this patent is extended or adjusted under 35 U.S.C. 154(b) by 299 days.

(21) Appl. No.: 16/877,202

(22) Filed: May 18, 2020

Related U.S. Application Data (60) Provisional application No. 62/852,911, filed on May 24, 2019.

(51) Int. Cl.
  *H04L 29/06* (2006.01)
  *H04L 9/06* (2006.01)
  *H03M 7/30* (2006.01)
  *G06F 16/901* (2019.01)

(52) U.S. Cl.
  CPC ........ *H04L 9/0637* (2013.01); *G06F 16/9027* (2019.01); *H03M 7/702* (2013.01); *H04L 9/0643* (2013.01)

(58) Field of Classification Search
  None
  See application file for complete search history.

(56) References Cited

U.S. PATENT DOCUMENTS

| | | | |
|---|---|---|---|
| 2017/0364450 A1* | 12/2017 | Struttmann | G06F 16/9024 |
| 2019/0082007 A1* | 3/2019 | Klarman | H04L 67/1091 |
| 2020/0279235 A1* | 9/2020 | Booth | G06Q 20/102 |

FOREIGN PATENT DOCUMENTS

BR 112019015066 A2 * 6/2020 ........... G06F 15/177

* cited by examiner

*Primary Examiner* — Andrew J Steinle
(74) *Attorney, Agent, or Firm* — Eversheds Sutherland (US) LLP (57) ABSTRACT

Compression techniques by pre-sorting transactions in a consistent way. In at least one embodiment, the compression does not rely on consistent mempool across full nodes. Transactions in a block can be hashed and sorted. Ambiguity can arise from the hashes, which can be resolved using various techniques.

17 Claims, 5 Drawing Sheets

FIG. 5

TXILM: LOSSY BLOCK COMPRESSION WITH SALTED SHORT HASHING

CROSS REFERENCE TO RELATED APPLICATIONS

This application claims priority to U.S. Provisional Patent Application No. 62/852,911, filed May 24, 2019, entitled "TXILM: LOSSY BLOCK COMPRESSION WITH SALTED SHORT HASHING," the disclosure of which is incorporated by reference herein in its entirety.

BACKGROUND OF THE INVENTION

A blockchain is a consensus-based, electronic ledger which is implemented as a computer-based decentralized, distributed system made up of blocks which in turn are made up of transactions and other information. Nodes of the blockchain maintain a global ledger of all transactions on the blockchain. Accordingly, there is a need to efficiently store data that represents the transactions on the blockchain.

Compact blocks carry only transaction identifiers (TXIDs) by assuming most transactions are already stored in the mempool for most full nodes. Compact blocks can be used to replace a transaction (e.g., 300-400 bytes in size) with a TXID, which is computed using a secure hash function over the transaction (e.g., a 32-byte SHA_256 hash of the transaction). Compact block yields approximately a 10 times bandwidth savings. However, there are blockchain ledgers which can grow in size indefinitely as more transactions are added to the ledger, and in some cases, greater compression efficiency is needed and/or is beneficial to the operation of computer systems participating in a blockchain network.

DETAILED DESCRIPTION OF THE INVENTION

As will be discussed in greater detail herein, disclosed herein can be a lossy block compression with salted short hashing, as named Txilm. In various embodiments, the size of a transaction representation is reduced to be on the order of 40-bits, which compresses a transaction by approximately 64× (e.g., 300-400 bytes transaction is compressed to a 40-bit representation where 1 byte=8 bits). As described in greater detail herein below, additional data structures such as a bloom filter or invertible Bloom lookup table (IBLT) is not required to perform the compression technique. In at least one embodiment, the compression does not rely on consistent mempool across full nodes. The compression can be implemented at least in part using one or more computer systems which may be in accordance with the computing device 100 described in FIG. 1.

Higher compression ratios can be achieved, in various embodiments, by pre-sorting transactions in a consistent way. Short hashing can be further reduced to 32-bits, which yield data size reduction on the order of 80×.

From the foregoing it will be appreciated that, although specific embodiments of the invention have been described herein for purposes of illustration, various modifications may be made without deviating from the spirit and scope of the invention.

Blocks, as referred to in various embodiments, are data structures in a blockchain (e.g., Bitcoin) which carry a collection of validated transactions in each step of consensus. In many blockchain systems, the transmission of the blocks dominates the consumption of bandwidth. Txilm provides a lossy compression method to significantly reduce the size of data transmission of blocks.

In at least one embodiment, a distributed computer system (e.g., full node of the blockchain network) sorts transactions in blocks and in mempools in a consistent order based on the hash of each transaction. The ordering can be based on TXID but can also be based on other criteria. In an embodiment once the transactions have been sorted, the system encodes the original block to an ordered list of TXID-HASHs. In at least one embodiment, a TXID-HASH generates a fixed-size output based on an input that includes at least a transaction identifier. In at least one embodiment, a TXID-HASH output is generated as the result of a short hash function h that provides small sized hash values (e.g., CRC32, CRC64 or any other suitable hash function) that has an input generated based on a salt and the transaction identifier that is to be hashed. In at least one embodiment, the salt is a cryptographic salt generated in a manner (e.g., randomly or pseudo-randomly) that makes it improbable, but unlikely that two blocks may have the same salt values. In at least one embodiment, TXID-HASH=h(Salt+TXID). In at least one embodiment, the TXID is computed using SHA256 (or another secure hash function) over the actual content of the transaction.

In some embodiments, the list of TXID-HASH is transmitted instead of the original transaction. In an embodiment, transactions typically take up 200-400 bytes and each TXID-HASH takes 3-5 bytes, thereby yielding approximately 100× bandwidth saving for broadcasting of the newly created blocks after each step of consensus.

In various embodiments, a computer system participating in the blockchain network (e.g., node) presents each transaction in a block by a small hash value based on TXID: TXID-HASH=h(TXID) in which h is a cryptographic hash function or other suitable one-way function. In various embodiments, h is or is based on CRC32, CRC40, CRC64, and the like. In an embodiment, the compact block scheme proposed herein includes a list of TXID-HASH ordered as the original list of transactions.

In various embodiments, ambiguity may occur with such a k-bit small-sized hash, which can be resolved by full nodes of the blockchain network. In some embodiments, a full node receives a new block that includes the TXID-HASH list from a sender and the receiver (e.g., the full node) searches each received TXID-HASH in the hash list produced by its mempool. There are, in some embodiments, three possible outcomes of the search: (1) not found; (2) single match found; (3) multiple matches found. In at least one embodiment, if no transaction in the mempool matches the receiver will request the TXID (e.g., from the sender or other peers). In at least one embodiment, if a single match is found, the transaction identifier is resolved based on the matching TXID-HASH found in the mempool and its corresponding transaction (e.g., determined based on the ordering). In at least one embodiment, if multiple matches are found, the receiver collects all matching TXIDs as candidates for a second-stage resolution.

In a second-stage resolution, the receiver may iterate through all combinations of candidates of multiple TXID-HASH for recomputing the Merkle tree—a correct combination will result in a matched Merkle root with the one carried by the block header. However, if none of the combinations in (3) or the resolved TXID list in (2) cannot match the Merkle root in the block header, the receiver can, in an embodiment, fall back to ask the sender to transfer the complete TXID list of the block. This case can occur, in some cases, where at least one TXID in the receiver mempool has the same TXID-HASH in the received TXID-HASH list, while this is not the one included in the block.

In at least one embodiment, the second-stage resolution includes a lightweight pre-check before recomputing the Merkle root. As described herein, a lightweight Merkle tree can be generated by replacing SHA256 with CRC32, the CRC32-Merkle tree with a 4-byte root. In an embodiment, when creating a new block, the 4-byte CRC32-Merkle root is prepended to the encoded TXID-HASH. While this is merely one among many variations, searching for the right combination is greatly improved, with up to a 40× acceleration by using CRC32 over 8 bytes vs. SHA256 over 16 bytes.

In an embodiment, resolving ambiguity incurs latency and iterating through the combination of ambiguous TXID_HASHs may consume additional compute resources. In an embodiment, a system is configured such that the length of the hash value (e.g., the k-bit) and also the size of the mempool are sufficiently large so that the mathematically expected run-time is below a maximum acceptable threshold.

A collision, in an embodiment, refers to any of cases (1) to (3) occurring at least once. Such a collision can be within the TXID-HASH list received or between the received list and the mempool. Given a TXID-HASH with k-bits, the collision rate can be at a rate of $$\left(\frac{1}{2}\right)^k.$$

For example, if there is a total m transactions in the mempool in average, and a new block carries n transactions, the probability of a single collision occurring can be approximated as:

$$PCS = 1 - \left(1 - \left(\frac{1}{2}\right)^k\right)^{m*n + n*\frac{n}{2}}$$

For example, if m=60,000 and n=10,000:
k=32, PSC=0.14
k=40, PSC=0.00059
k=48, PSC=0.0000023

In an embodiment, k=40 is a reasonable value that balances good compression ratio with low collision rate. A sufficient k is roughly proportional to $$\log\left(m*n + n*\frac{n}{2}\right).$$

For example, enlarging to 100×: m=6000000, n=1000000:
k=48, PSC=0.023
k=56, PSC=0.000090
k=64, PSC=0.00000035
Or, reduce to something much smaller: m=3000, n=200:
k=24, PSC=0.036
k=32, PSC=0.00014
k=40, PSC=0.00000056

In various embodiments, we restrict transactions in the block as well as in mempool are sorted based on their TXID with a consistent order, thus the resolved TXID should restricted to conform that order. In various embodiments, this provides a priori knowledge for resolving ambiguous TXID-HASH. By using ordered transactions, the proposed scheme can achieve much lower collision probability and/or higher compression ratios. Since transactions are ordered in both blocks and mempools, the candidate space of any ambiguous TXID-HASH, in various embodiments, is narrowed to a range bound by its previous and next TXID with resolved TXID-HASH instead of the entire mempool In an embodiment where it is assumed that newly confirmed TXID are evenly distributed in the sorted mempool, the size of the potential collision space is reduced from m to m/n. In various embodiments, collisions within a block only occur if the ambiguous TXID-HASHs are adjacent after ordering. This can drastically reduce the collision probability and the computational and/or bandwidth cost of resolving ambiguity, which allows even shorter hashes with higher compression ratios.

In an embodiment, transactions are ordered by canonical transaction ordering rule (CTOR). The collision probability, in some cases, is approximated as:

$$PCS = 1 - \left(1 - \left(\frac{1}{2}\right)^k\right)^{m + \frac{n}{2}}$$

For small blocks: m=3,000, n=200:
k=16, PSC=0.046
k=24, PSC=0.00018
k=32, PSC=0.00000072
For medium blocks: m=60,000, n=10,000:
k=16, PSC=0.63
k=24, PSC=0.0039
k=32, PSC=0.000015
For large blocks: m=6,000,000, n=1,000,000:
k=24, PSC=0.32
k=32, PSC=0.0015
k=40, PSC=0.0000059

In some cases, it may be possible to construct a new transaction with a TXID-HASH that matches with that of an existing transaction, either inadvertently or maliciously. For example, massive creation of malicious transactions for collision may invalidate the collision probability analysis stated above and make the verification of new blocks costly, which eventually results in a high fork rate. In various embodiments, techniques described herein can be used to mitigate collision attacks. As a first example, short hashing with salt is a strategy that introduces a salt when calculating the TXID-HASH:

TXID-HASH=$h$(Salt+TXID)

The salt, in various embodiments, is a cryptographic salt that is specific to the block carrying those TXID-HASHs and included in the encoded data. In an embodiment, CRC32-Merkle is taken as the hash, or a 4-byte field with randomly or pseudo-randomly generated bits are also acceptable salt values. By introducing a salt, an attacker may be unable to construct malicious transactions even though existing transactions are known to all until a new block carrying them is broadcasted. Malicious transactions are unlikely to reach full nodes earlier than the new block is received and verified. Accordingly this strategy makes malicious transactions specific to a single block, thus malicious transactions spread previously will not be able to hamper future block creation and makes attacks much more inefficient and less effective.

As a second example (which can be implemented independently or in combination with the first example), miners can be required to fall back on transmitting the complete TXID list when the entire blockchain network is stressed with a high degree of load (e.g., an abnormally or extremely high volume of transactions being generated by a malicious party to stress the blockchain network). In some embodiments, transmitting the complete TXID list thwarts collision-based attacks (e.g., even where salts are used). For example, when the blockchain network is in a state where an extremely high volume of transactions are being processed and/or collision rate is abnormally high or extremely high, miners may be incentive to send the complete TXID list because creating orphan block is wasting hash rate and not desired. An abnormally high collision rate can be determined based on probabilistic models indicating that an extremely high rate of collisions are occurring relative to the number of transactions in a TXID list, thereby indicating that there is a high probability of malicious activity causing collisions. In some embodiments, such attacks can be observed by full nodes and miners when verifying incoming new blocks. For example, a node (e.g., miner or full node) counts the number of ambiguous TXID-HASH per-block and if the count of ambiguous items is significantly higher than expected (e.g., probability of less than $10^\wedge x$ to occur, where x can be tuned to ensure sufficient protection from collision attacks while also not excessively encumbering the network's normal operation) and forks are observed, then the next block is to fall back to the TXID list.

Pre-image resistant functions include one-way functions (i.e., functions that may not be computationally difficult to compute for a current value, but may not be computationally trivial to determine a previous value from the current value), having a recurrence relationship to a previous value of the function. The one-way membership function may not be mathematically proven/provable as one-way, but have computational complexity properties that render the function pre-image resistant. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (e.g., with the password being based at least in part on the plaintext and the cryptographic key) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of pre-image resistance (given a value y, the probability of randomly generating an input x such that $f(x)=y$ is below a specified threshold), second pre-image resistance (given an input $x_1$, the probability of randomly generating another input $x_2$, different from $x_1$, such that $f(x_1)=f(x_2)$ is below a specified threshold) and/or collision resistance (the probability of two different inputs resulting in the same output is less than a specified threshold). One-way functions suitable for use in generating an identifier for data include functions that satisfy properties of collision resistance (i.e., the probability of $f(x_1)=f(x_2)$ for different $x_1$ and $x_2$ is below a threshold). Other hash functions (e.g., "secure hash functions" as described above) usable in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference.

Figure 1:
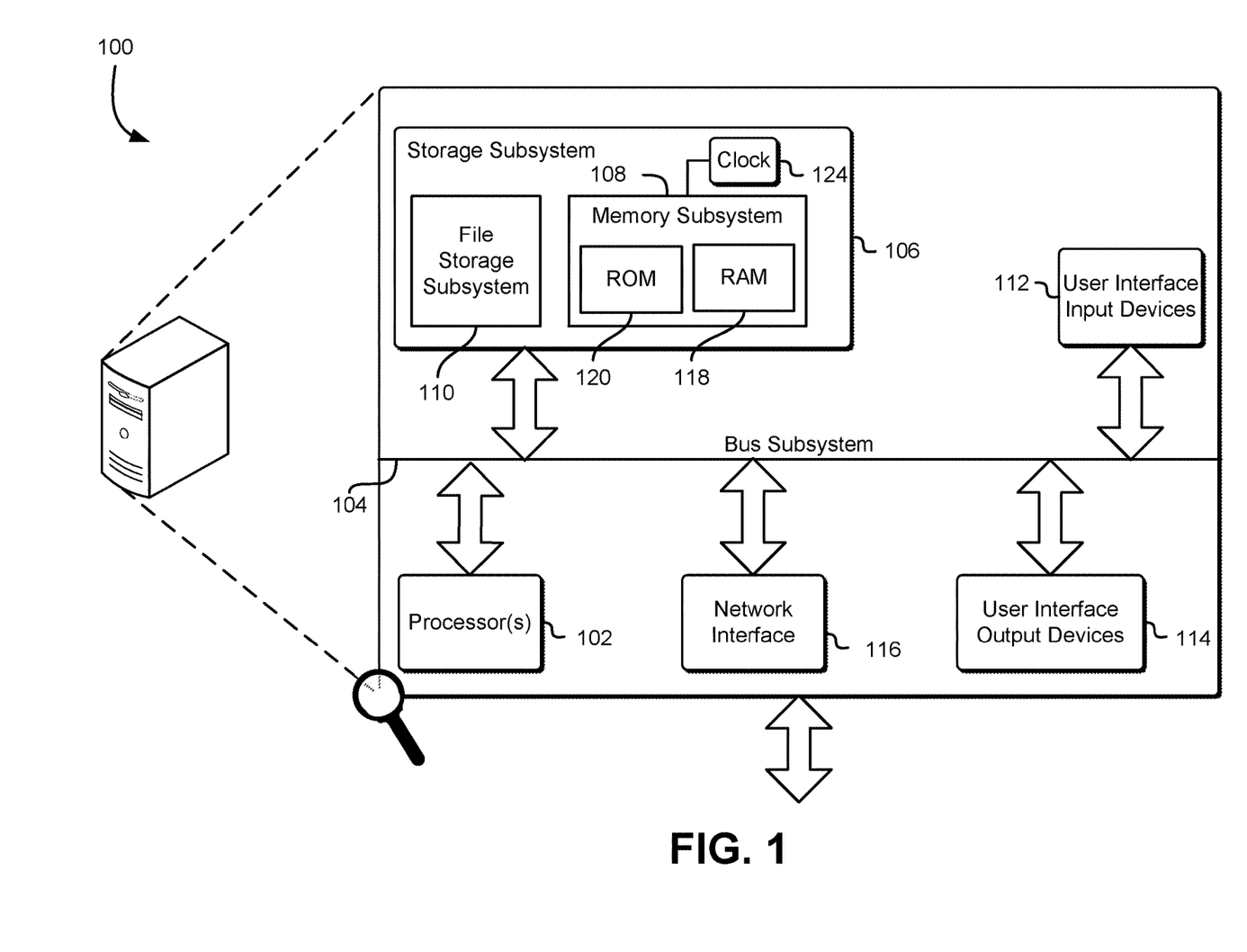
FIG. 1 illustrates an environment in which various embodiments can be implemented.

FIG. 1 is an illustrative, simplified block diagram of a computing device 100 that can be used to practice at least one embodiment of the present disclosure. In various embodiments, the computing device 100 may be used to implement any of the systems illustrated and described above. For example, the computing device 100 may be configured for use as a data server, a web server, a portable computing device, a personal computer, or any electronic computing device. As shown in FIG. 1, the computing device 100 may include one or more processors 102 that, in embodiments, communicate with and are operatively coupled to a number of peripheral subsystems via a bus subsystem. In some embodiments, these peripheral subsystems include a storage subsystem 106, comprising a memory subsystem 108 and a file/disk storage subsystem 110, one or more user interface input devices 112, one or more user interface output devices 114, and a network interface subsystem 116. Such storage subsystem 106 may be used for temporary or long-term storage of information.

In some embodiments, the bus subsystem 104 may provide a mechanism for enabling the various components and subsystems of computing device 100 to communicate with each other as intended. Although the bus subsystem 104 is shown schematically as a single bus, alternative embodiments of the bus subsystem utilize multiple buses. The network interface subsystem 116 may provide an interface to other computing devices and networks. The network interface subsystem 116 may serve as an interface for receiving data from and transmitting data to other systems from the computing device 100. In some embodiments, the bus subsystem 104 is utilized for communicating data such as details, search terms, and so on.

In some embodiments, the user interface input devices 112 includes one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 100. In some embodiments, the one or more user interface output devices 114 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 100. The one or more user interface output devices 114 can be used, for example, to present user interfaces to facilitate user interaction with applications performing processes described and variations therein, when such interaction may be appropriate.

In some embodiments, the storage subsystem 106 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 106. These application modules or instructions can be executed by the one or more processors 102. In various embodiments, the storage subsystem 106 additionally provides a repository for storing data used in accordance with the present disclosure. In some embodiments, the storage subsystem 106 comprises a memory subsystem 108 and a file/disk storage subsystem 110.

In embodiments, the memory subsystem 108 includes a number of memories, such as a main random access memory (RAM) 118 for storage of instructions and data during program execution and/or a read only memory (ROM) 120, in which fixed instructions can be stored. In some embodiments, the file/disk storage subsystem 110 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 100 includes at least one local clock 124. The at least one local clock 124, in some embodiments, is a counter that represents the number of ticks that have transpired from a particular starting date and, in some embodiments, is located integrally within the computing device 100. In various embodiments, the at least one local clock 124 is used to synchronize data transfers in the processors for the computing device 100 and the subsystems included therein at specific clock pulses and can be used to coordinate synchronous operations between the computing device 100 and other systems in a data center. In another embodiment, the local clock is a programmable interval timer.

The computing device 100 could be of any of a variety of types, including a portable computer device, tablet computer, a workstation, or any other device described below. Additionally, the computing device 100 can include another device that, in some embodiments, can be connected to the computing device 100 through one or more ports (e.g., USB, a headphone jack, Lightning connector, etc.). In embodiments, such a device includes a port that accepts a fiber-optic connector. Accordingly, in some embodiments, this device is that converts optical signals to electrical signals that are transmitted through the port connecting the device to the computing device 100 for processing. Due to the ever-changing nature of computers and networks, the description of the computing device 100 depicted in FIG. 1 is intended only as a specific example for purposes of illustrating the preferred embodiment of the device. Many other configurations having more or fewer components than the system depicted in FIG. 1 are possible.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

Figure 2:
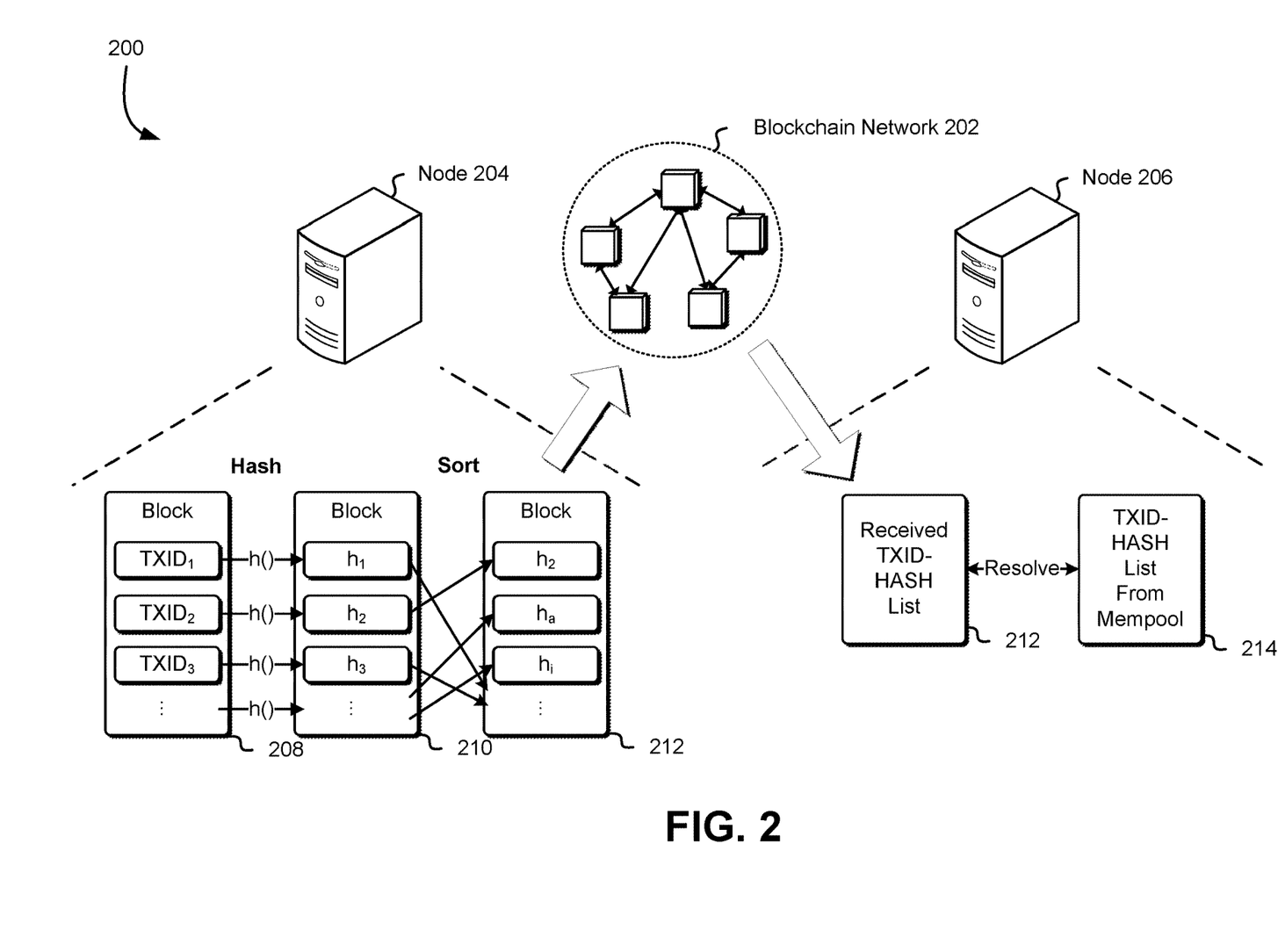
FIG. 2 illustrates, in accordance with at least one embodiment, lossy block compression with salted short hashing.

FIG. 2 depicts an illustrative diagram of a computing environment 200 in which one or more embodiments can be implemented. In at least one embodiment, computing environment 200 comprises a blockchain network 202, node 204, and node 206.

Blockchain network 202 may refer to Bitcoin, Ethereum, and various other types of blockchain networks which can be based on a consensus protocol. Blockchain network 202 may, for example, utilize a proof-of-work and/or proof-of-stake consensus protocol. Nodes of a blockchain network 202 may maintain a global ledger of all transactions on the blockchain network. Blockchain network 202 may be in accordance with those described elsewhere in this disclosure, such as those discussed in greater detail below.

In at least one embodiment, node 204 is a full node of blockchain network 202. In at least one embodiment, node 204 sorts transactions in block 208 in a consistent order based on the hashes of each transaction. In a TXID-HASH output $h_1$, $h_2$, . . . is generated as a result of a short hash function h( ) that provides small sized hash values (e.g., CRC32, CRC64) that has an input generated based on a salt and a transaction identifier $TXID_1$, $TXID_2$, . . . and the resulting list of TXID-HASH outputs 210 are sorted to form a sorted TXID-HASH list 212. In at least one embodiment, transactions are sorted based on their TXID with a consistent order, thus the resolved TXID should be restricted to conform to a specific order.

In some embodiments, the list of TXID-HASH is transmitted instead of the original transaction. In an embodiment, transactions typically take up 200-400 bytes and each TXID-HASH takes 3-5 bytes, thereby yielding approximately 100× bandwidth saving for broadcasting of the newly created blocks after each step of consensus. In at least one embodiment, the TXID-HASH list 212 is transmitted to blockchain network 202 and made available to participating nodes such as node 206 depicted in FIG. 2.

In some embodiments, node 206 is a full node and receives a new block that includes the TXID-HASH list 212 from a sender and the receiver (e.g., the full node) searches each received TXID-HASH in the hash list 214 produced by its mempool. There are, in some embodiments, three possible outcomes of the search: (1) not found; (2) single match found; (3) multiple matches found. In at least one embodiment, if no transaction in the mempool matches the receiver will request the TXID (e.g., from the sender or other peers). In at least one embodiment, if a single match is found, the transaction identifier is resolved based on the matching TXID-HASH found in the mempool and its corresponding transaction (e.g., determined based on the ordering). In at least one embodiment, if multiple matches are found, the receiver collects all matching TXIDs as candidates for a second-stage resolution. IN at least one embodiment, second-stage resolution is implemented in accordance with descriptions elsewhere in this disclosure, either above and/or below.

Figure 3:
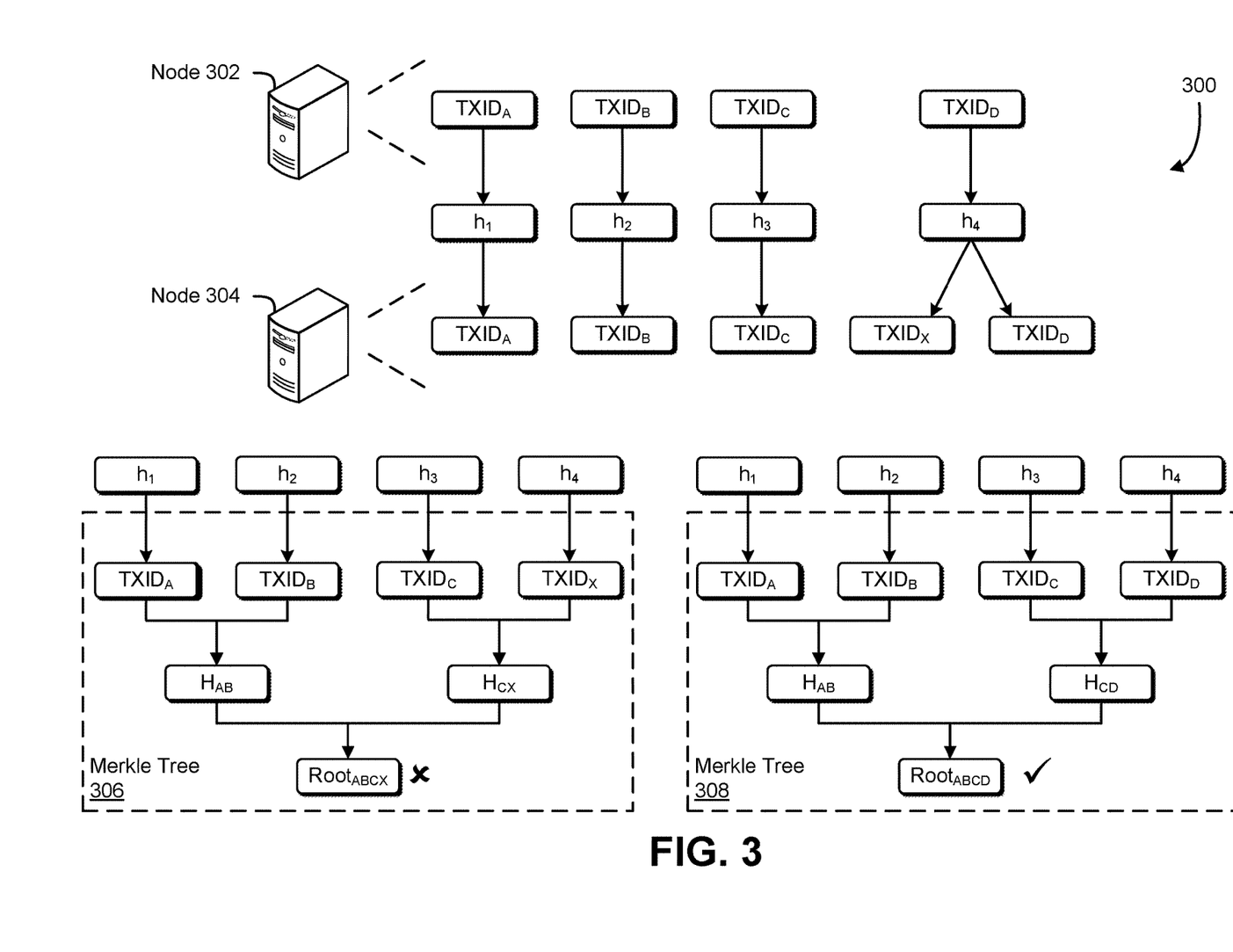
FIG. 3 illustrates, in accordance with at least one embodiment, second-stage resolution.

FIG. 3 depicts an illustrative diagram of a computing environment 300 in which a second-stage resolution is performed, in accordance with at least one embodiment.

In at least one embodiment, node 302 is a sender node that sorts transactions in blocks and in mempools in a consistent order based on the hash of each transaction. The ordering can be based on TXID but can also be based on other criteria. In an embodiment once the transactions have been sorted, the system encodes the original block to an ordered list of TXID-HASHs. In at least one embodiment, a TXID-HASH generates a fixed-size output based on an input that includes at least a transaction identifier. In at least one embodiment, a TXID-HASH output is generated as the result of a short hash function h that provides small sized hash values (e.g., CRC32, CRC64 or any other suitable hash function) that has an input generated based on a salt and the transaction identifier that is to be hashed. In at least one embodiment, the salt is a cryptographic salt generated in a manner (e.g., randomly or pseudo-randomly) that makes it improbable, but unlikely that two blocks may have the same salt values. In at least one embodiment, TXID-HASH=h(Salt+TXID). In at least one embodiment, the TXID is computed using SHA256 (or another secure hash function) over the actual content of the transaction.

FIG. 3 illustrates an example in which a sorted list of transactions $\{TXID_A, TXID_B, TXID_C, TXID_D\}$ is used to generate a corresponding TXID-HASH list $\{h_1, h_2, h_3, h_4\}$. TXID-HASH can be generated using any suitable technique such as those described elsewhere in this disclosure. For example, $h_1=h(TXID_A)$ where h( ) is a cryptographic hash function—note that in some cases, a salt may also be used. TXID-HASH list may be transmitted and received by node 304.

In at least one embodiment, node 304 is a full node that receives a new block that includes the TXID-HASH list $\{h_1, h_2, h_3, h_4\}$ from node 302 and the receiver searches each received TXID-HASH in the hash list produced by its mempool. As discussed above already, there are, in some embodiments, three possible outcomes of the search: (1) not found; (2) single match found; (3) multiple matches found. FIG. 3 illustrates an example in which there is multiple matches found for a TXID-HASH $h_4$, wherein node 304 found two different transactions in its mempool that match TXID-HASH $h_4$—in other words, it may be the case that $h(TXID_X)=h_1$ and $h(TXID_D)=h_1$.

A second-stage resolution may be performed as a result of at least one multiple match being found. In at least one embodiment, node 304 iterates through all combinations of candidates of multiple TXID-HASH and computes a Merkle tree for each combination. For example, a first Merkle tree 306 may be computed with a first TXID of the multiple matches and a second Merkle tree 308 may be computed with a second TXID of the multiple matches, and so on. If the Merkle root of a particular combination matches the Merkle root carried by the block header, that combination is a correct combination. For example, in FIG. 3, it may be the case that hashing $TXID_C$ and $TXID_X$ results in $H_{CX}$ that is different from result $H_{CD}$ generated from hashing $TXID_C$ and $TXID_D$.

FIG. 3 merely illustrates one example among many which are contemplated within the scope of this disclosure. In some cases, the TXID-HASH list includes multiple entries that have multiple matches. For example, if one entry in TXID-HASH list includes two matches and a second entry in TXID-HASH list includes three matches, 2×3=6 there may be 6 combinations to be evaluated as part of second-stage resolution.

Figure 4:
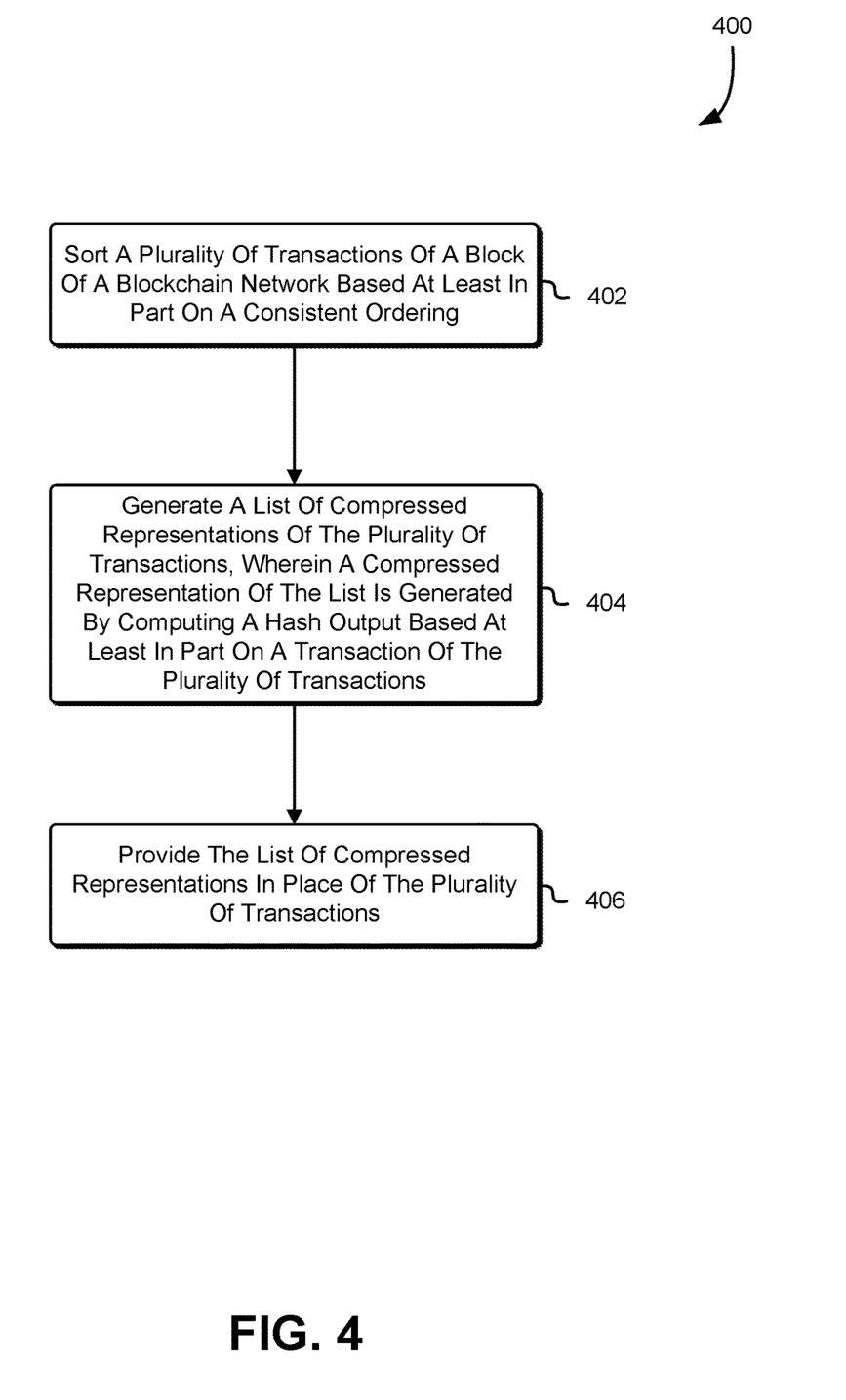
FIG. 4 shows an illustrative example of a process for compression techniques that can be utilized in the context of blockchain networks.

FIG. 4 shows an illustrative example of a process 400 relating to compression techniques that can be utilized in the context of blockchain networks, in accordance with at least one embodiment. In at least one embodiment, process 400 can be utilized to implement lossy block compression with salted short hashing. Some or all of the process 400 (or any other processes described herein, or variations and/or combinations thereof) may be performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 400 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In at least some cases, process 400 is performed by a full node of a blockchain network. Process 400 may be implemented at least in part using a computing device in accordance with FIG. 1.

In at least some embodiment, a computer system performing process 400 sorts 402 a plurality of transactions of a block of a blockchain network based at least in part on a consistent ordering. In some cases, the computer system sorts transactions in blocks and in mempools in a consistent order. In at least some embodiments, the consistent ordering is based on the hash of each transaction, based on TXID, or based on any other suitable criteria. Any suitable sorting algorithm may be utilized, so long as a consistent ordering is produced.

In at least one embodiment, a computer system performing process 400 generates 404 a list of compressed representations of the plurality of transactions, wherein a compressed representation of the list is generated by computing a hash output based at least in part on a transaction of the plurality of transactions. In at least one embodiment, once the plurality of transactions has been sorted, the computer system encodes the original block to an ordered list of TXID-HASHs. In at least one embodiment, a TXID-HASH generates a fixed-size output based on an input that includes at least a transaction identifier. In at least one embodiment, a TXID-HASH output is generated as the result of a short hash function h that provides small sized hash values (e.g., CRC32, CRC64 or any other suitable hash function) that has an input generated based on a salt and the transaction identifier that is to be hashed. In at least one embodiment, the salt is a cryptographic salt generated in a manner (e.g., randomly or pseudo-randomly) that makes it improbable, but unlikely that two blocks may have the same salt values. In at least one embodiment, TXID-HASH=h(Salt+TXID). In at least one embodiment, the TXID is computed using SHA256 (or another secure hash function) over the actual content of the transaction.

In at least one embodiment, the computer system performing process 400 provides 406 the list of compressed representations in place of the plurality of transactions. In at least one embodiment, a list of TXID-HASH is transmitted instead of corresponding blockchain transactions. For example, a typical may take up 200-400 bytes and a TXID-HASH takes 3-5 bytes, thereby yielding approximately 100× bandwidth saving for broadcasting of the newly created blocks after each step of consensus. In at least one embodiment, the list of compressed representations is broadcasted to a blockchain network in place of the original transactions. In at least one embodiment, the list of compressed representations is broadcasted to a blockchain network and a receiver (e.g., full node) receives a new block that includes the list of compressed representations and can utilize techniques such as those discussed in connection with FIG. 5.

Figure 5:
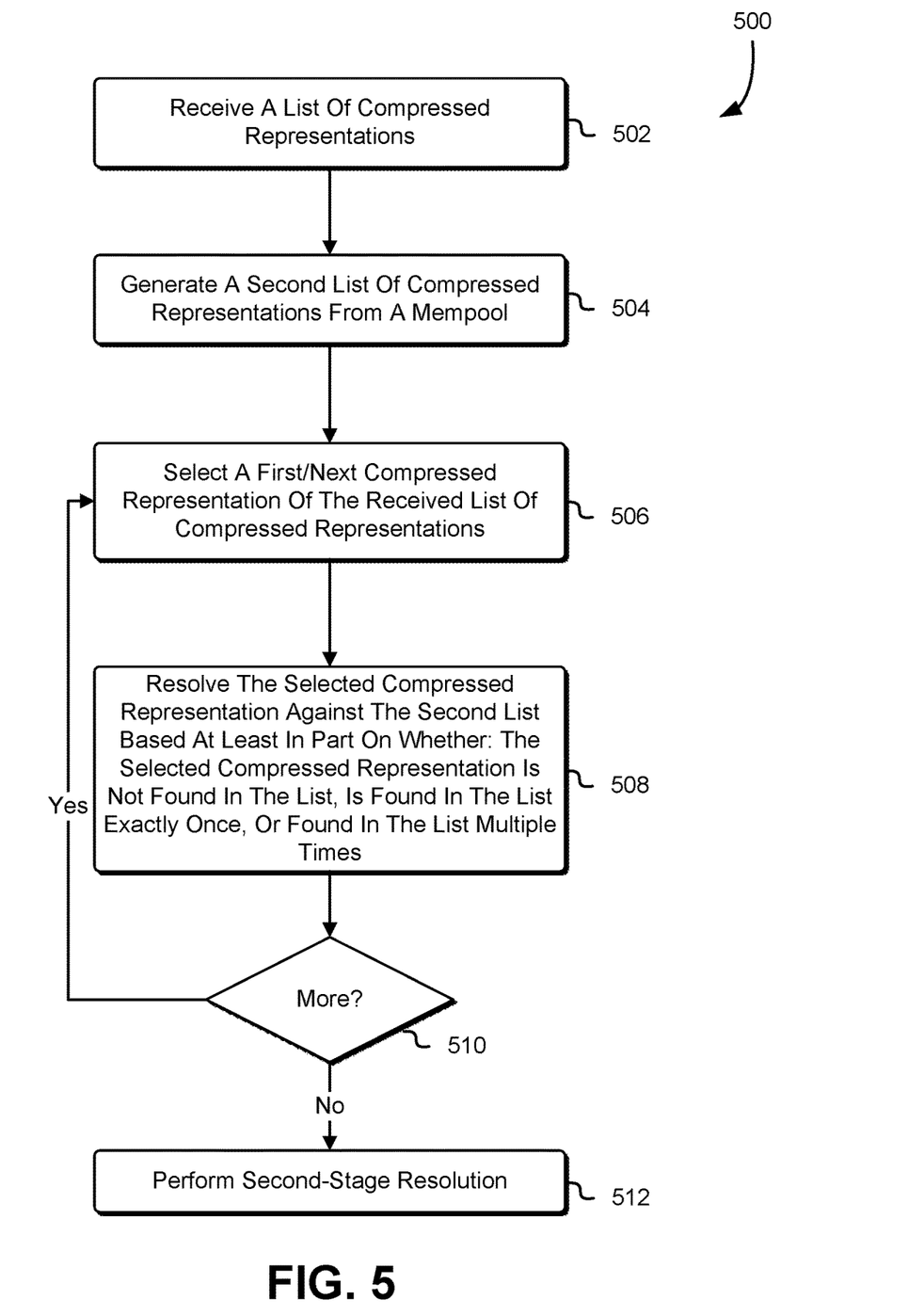
FIG. 5 shows an illustrative example of a process for compression techniques that can be utilized in the context of blockchain networks.

FIG. 5 shows an illustrative example of a process 500 relating to compression techniques that can be utilized in the context of blockchain networks, in accordance with at least one embodiment. In at least one embodiment, process 500 can be utilized to implement lossy block compression with salted short hashing. Some or all of the process 500 (or any other processes described herein, or variations and/or combinations thereof) may be performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 500 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In at least some cases, process 500 is performed by a full node of a blockchain network. Process 500 may be implemented at least in part using a computing device in accordance with FIG. 1.

In at least one embodiment, a computer system performing process 500 receives 502 a list of compressed representations. In at least one embodiment, a list of compressed representations is generated using techniques described in connection with FIG. 4 and the computer system performing process 500 receives the list of compressed representations as a list of TXID-HASH ordered as the original list of transactions.

In at least one embodiment, a computer system performing process 500 generates 504 a second list of compressed representations from a mempool. In at least one embodiment, a full node receives a new block that includes the TXID-HASH list from a sender and the receiver (e.g., the full node) searches each received TXID-HASH in the hash list produced by its mempool to generate a second list of compressed representations from its mempool that match the received TXID-HASH received.

In at least one embodiment, a computer system performing process 500 selects 506 a first compressed representation of the received list of compressed representations. In at least one embodiment, each received compressed representation is resolved 508 against a second list of compressed representations from the mempool. In some embodiments, three possible outcomes of the search: (1) not found; (2) single match found; (3) multiple matches found. In at least one embodiment, if no transaction in the mempool matches the receiver will request the TXID (e.g., from the sender or other peers). In at least one embodiment, if a single match is found, the transaction identifier is resolved based on the matching TXID-HASH found in the mempool and its corresponding transaction (e.g., determined based on the ordering). In at least one embodiment, if multiple matches are found, the receiver collects all matching TXIDs as candidates for a second-stage resolution. In at least one embodiment, steps 506-510 are repeated for each TXID-HASH in the received list until there are no more TXID-HASH to check.

In at least one embodiment, a computer system performing process 500 performs 512 a second-stage resolution. In at least one embodiment, a second-stage resolution is only needed where there are one or more multiple matches found, corresponding to (3) above. In a second-stage resolution, the receiver may iterate through all combinations of candidates of multiple TXID-HASH for recomputing the Merkle tree—a correct combination will result in a matched Merkle root with the one carried by the block header. However, if none of the combinations in (3) or the resolved TXID list in (2) cannot match the Merkle root in the block header, the receiver can, in an embodiment, fall back to ask the sender to transfer the complete TXID list of the block. This case can occur, in some cases, where at least one TXID in the receiver mempool has the same TXID-HASH in the received TXID-HASH list, while this is not the one included in the block.

In at least one embodiment, the second-stage resolution includes a lightweight pre-check before recomputing the Merkle root. As described herein, a lightweight Merkle tree can be generated by replacing SHA256 with CRC32, the CRC32-Merkle tree with a 4-byte root. In an embodiment, when creating a new block, the 4-byte CRC32-Merkle root is prepended to the encoded TXID-HASH. While this is merely one among many variations, searching for the right combination is greatly improved, with up to a 40× acceleration by using CRC32 over 8 bytes vs. SHA256 over 16 bytes.

In an embodiment, resolving ambiguity incurs latency and iterating through the combination of ambiguous TXID_HASHs may consume additional compute resources. In an embodiment, a system is configured such that the length of the hash value (e.g., the k-bit) and also the size of the mempool are sufficiently large so that the mathematically expected run-time is below a maximum acceptable threshold.

In at least some embodiment, a "blockchain" or "blockchain network" refers to any and all suitable forms of distributed ledgers, which includes consensus-based blockchain and transaction-chain technologies, permissioned and un-permissioned ledgers, shared ledgers, and more. Non-limiting examples of blockchain technology include Bitcoin and Ethereum, although other examples of blockchain technologies are also contemplated in the scope of this disclosure. While Bitcoin and Ethereum may be described in connection with various embodiments of this disclosure, those embodiments are to be construed merely as illustrative examples and not limiting. For example, alternative blockchain implementations and protocols are contemplated within the scope of the present disclosure.

A blockchain network may refer to a peer-to-peer electronic ledger implemented as a decentralized system. A ledger may comprise multiple blocks wherein a genesis block is a first block of the ledger and all other blocks reference a previous block. In at least some embodiment, each block (except the genesis block) includes a hash of the previous block to which that block became chained together to create an immutable record of the block to the blockchain ledger which cannot be modified, deleted, or otherwise altered. A block may include one or more blockchain transactions. A blockchain transaction may refer to a data structure that encodes the transfer of control of a digital asset between users of the blockchain network. For example, a blockchain transaction may transfer control of a digital asset from a source address to a destination address. The blockchain transaction may be signed with a private key associated with the address which can be cryptographically verified using a corresponding public key that is made available to other parties of the blockchain network. In at least one embodiment a blockchain transaction includes a transaction input and a transaction output.

In some embodiment, a blockchain transaction is validated before it is committed to the blockchain ledger as part of a block. Blockchain nodes may be used to verify blockchain transactions, which may include verifying digital signatures of transactions, verifying that a purported owner of a digital asset is actually the owner by inspecting the blockchain ledger to verify that control of the digital asset was transferred to the purported owner and that the purported owner has not elsewhere transferred control of the digital asset (meaning that the purported owner was previous the owner of the digital asset but has previously transferred control to another entity).

Validity in the blockchain context may be consensus based, and a transaction may be considered valid if a majority of nodes agrees that the blockchain transaction is valid. In at least some embodiments, a blockchain transaction references an unspent transaction output (UTXO) that is used to validate the transaction by executing the UTXO locking and unlocking script. If the UTXO locking and unlocking script executes successfully (e.g., by evaluating to TRUE and any other validation operations). Accordingly, a blockchain transaction is written to a blockchain ledger when it is validated by a node that receives the transaction and is added to a new block by a node (e.g., miner) and actually mined by being added to the public ledger of past transactions. In at least some embodiment, a blockchain transaction is considered to be confirmed when a certain number of subsequent blocks are added to the blockchain ledger, whereinafter the blockchain transaction becomes virtually irreversible.

A blockchain transaction output may include a locking script that "locks" a digital asset by specifying a condition that is to be met in order for the encumbrance to be lifted or unlocked (e.g., to allow control of the digital asset to be transferred to another user). A locking script may be referred to as an encumbrance. An unlocking script may be a corresponding script that in combination with the locking script, removes an encumbrance on digital assets. A locking script and unlocking script may be combined to form executable code that, if executed to completion or to yield a specific result, indicates that the unlocking script is valid and that the encumbrance may be removed. For example, "scriptPubKey" is a locking script in Bitcoin and "scriptSig" is an unlocking script.

It should be noted that while blockchain technology is perhaps most widely known for its use cryptocurrency, there are many other applications for blockchain technologies for providing secure systems. A secure system may refer to a system in which functionality—such as the exchange of digital assets between two or more entities—is cryptographically verifiable. A secure system may be robust to failure. A secure system may be immutable such that information that is committed to the blockchain ledger cannot be unilaterally modified by an individual. A secure system may provide additional assurances, such as assurances of confidentiality, integrity, authenticity, and nonrepudiation. Confidentiality may refer to assurances that certain information is not made publicly available (e.g., the underlying identity of a blockchain address may be kept secret or unknown). Authenticity may refer to assurances that a message was created by a party purporting to be the author of the message. Integrity may refer to assurances that a received message was not modified either intentionally (e.g., by a malicious party) or unintentionally (e.g., as a result of signal loss during transmission) from its original form when the message was transmitted. Nonrepudiation may refer to assurances that a party that digitally signs a blockchain transaction cannot deny the authenticity of the transaction.

Mining may refer to the process of validating blockchain transactions along a blockchain network. Validating blockchain transactions may involve a process of securing and verifying blockchain transactions (e.g., organized as blocks) along a blockchain. Mining may be a process that helps maintain network security by ensuring that valid blocks are recorded on a blockchain ledger. Generally speaking, participants in a mining process can be rewarded for using computing resources (e.g., compute resources such as CPUs) to solve computational algorithms. Mining can be done in various ways. Proof-of-work (POW) and proof-of-stake (POS) consensus are two non-limiting examples of how mining can be done.

Proof-of-stake may refer to a consensus algorithm in which validators secure new blocks before they are added to a blockchain network. In a POS mining algorithm, a node may participate in the mining process by staking an amount of digital assets. The POS may be a deterministic concept that states individuals are allowed to mine or validate new blocks equal to proportionally to the amount staked—in other words, the more digital assets a node stakes, the greater mining power the node has. In some cases, greater mining power means that a node has more opportunity to validate blocks and be rewarded. Opportunity may refer to probabilistic opportunity, in which a probability $p_1 > p_2$ does not necessarily guarantee that a first node with higher probability $p_1$ actually mines more than a second node with lower probability $p_2$ over a specific period of time. However, long-run, expected value of miners with larger staked amounts may be greater than those of miners with smaller staked amounts.

A node may become a miner by staking an amount of digital assets from the miner's blockchain wallet by transferring digital assets to a bound wallet. Miners, who may be called validators, delegates, or forgers, may be chosen or voted for randomly by holders of digital assets on the blockchain network. For a node to be chosen as a staker, the node needs to have deposited a certain amount or value of digital assets into a special staking wallet. In at least some embodiments, miners are entitled to forge or create new blocks proportional to the amount staked.

POS blockchain networks may have several important differences from POW blockchain networks. In general, anyone with enough digital assets can validate transactions on a blockchain network, and the benefits of specialized hardware such as application-specific integrated circuits (ASICs) is less pronounced than in POW blockchain networks. Generally speaking, POS blockchain networks may be more energy efficient and environmentally friendly than POW blockchain networks. Non-limiting examples of POS blockchain networks include: DASH; NEO; Lisk; Stratis; PIVX; OkCash; and more. Generally speaking, in a POW blockchain network, nodes with greater computing power are more likely to mine new blocks, whereas in POS blockchain networks, nodes with greater staking amounts are more likely to validators.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. Further, unless stated otherwise or otherwise clear from context, the phrase "based on" means "based at least in part on" and not "based solely on."

Operations of processes described can be performed in any suitable order unless otherwise indicated or otherwise clearly contradicted by context. Processes described (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. In some embodiments, the code can be stored on a computer-readable storage medium, for example, in the form of a computer program comprising a plurality of instructions executable by one or more processors. In some embodiments, the computer-readable storage medium is non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments will become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method comprising:
   sorting a plurality of transactions of a block of a blockchain network based at least in part on a consistent ordering;
   generating a list of compressed representations of the plurality of transactions, wherein a compressed representation of the list is generated by computing a hash output based at least in part on a transaction of the plurality of transactions;
   providing the list of compressed representations in place of the plurality of transactions;
   receiving, at a receiver computer system, the list of compressed representations;
   generating a second list of compressed representations from a mempool;
   selecting a compressed representation of the received list of compressed representations; and
   resolving the selected compressed representation against the second list based at least in part on whether:
      the selected compressed representation is not found in the second list;
      the selected compressed representation is found in the second list exactly once; or
      the selected compressed representation is found in the second list multiple times.

2. The method of claim 1, wherein as a result of the selected compressed representation being found in the second list multiple times:
   performing a second-stage resolution by at least iterating through the multiple matches to determine whether any of the multiple matches resolve to a Merkle root of the block.

3. The method of claim 1, wherein the method is implemented on a distributed system.

4. The method of claim 1, wherein:
   the hash output is computed further based at least in part on a cryptographic salt that is associated with the block of the blockchain; and a different block of the blockchain network is associated with a different cryptographic salt.

5. The method of claim 1, wherein the list of compressed representations is a list of transaction identifiers corresponding to the plurality of transactions, wherein the plurality of transactions are blockchain transactions.

6. The method of claim 1, wherein providing the list of compressed representations in place of the plurality of transactions yields at least a 10× bandwidth savings.

7. A system comprising one or more processors and memory that stores computer-readable instructions that, as a result of execution by the one or more processors, cause the system to:
sort a plurality of transactions of a block of a blockchain network based at least in part on a consistent ordering;
generate a list of compressed representations of the plurality of transactions, wherein a compressed representation of the list is generated by computing a hash output based at least in part on a transaction of the plurality of transactions;
provide the list of compressed representations in place of the plurality of transactions; and
wherein the system comprises a receiver computer system, wherein the receiver computer system comprises second one or more processors and stores second computer-readable instructions that, as a result of execution by the second one or more processors, causes the receiver computer system to:
receive the list of compressed representations;
generate a second list of compressed representations from a mempool;
select a compressed representation of the received list of compressed representations; and
resolve the selected compressed representation against the second list based at least in part on whether:
the selected compressed representation is not found in the second list;
the selected compressed representation is found in the second list exactly once; or
the selected compressed representation is found in the second list multiple times.

8. The system of claim 7, wherein the second computer-readable instructions include further instructions that, as a result of execution by the second one or more processors, further causes the receiver computer system to:
as a result of the selected compressed representation being found in the second list multiple times, perform a second-stage resolution by at least iterating through the multiple matches to determine whether any of the multiple matches resolve to a Merkle root of the block.

9. The system of claim 7, wherein the system is a full node of the blockchain network.

10. The system of claim 7, wherein:
the instructions to generate the list of compressed representations of the plurality of transactions include instructions to compute the hash output based at least in part on a cryptographic salt that is associated with the block of the blockchain; and
a different block of the blockchain network is associated with a different cryptographic salt.

11. The system of claim 7, wherein the list of compressed representations is a list of transaction identifiers corresponding to the plurality of transactions, wherein the plurality of transactions are blockchain transactions.

12. The system of claim 7, wherein the instructions to provide the list of compressed representations in place of the plurality of transactions, as a result of execution by the one or more processors, yields at least a 100× bandwidth savings.

13. A non-transitory computer-readable medium storing executable instructions that, as a result of being executed by one or more processors of a computer system, cause the computer system to:
sort a plurality of transactions of a block of a blockchain network based at least in part on a consistent ordering;
generate a list of compressed representations of the plurality of transactions, wherein a compressed representation of the list is generated by computing a hash output based at least in part on a transaction of the plurality of transactions;
provide the list of compressed representations in place of the plurality of transactions; and
wherein the executable instructions include further instructions that, as a result of being executed by second one or more processors of a second computer system, causes the second computer system to:
receive the list of compressed representations;
generate a second list of compressed representations from a mempool;
select a compressed representation of the received list of compressed representations; and
resolve the selected compressed representation against the second list based at least in part on whether:
the selected compressed representation is not found in the second list;
the selected compressed representation is found in the second list exactly once; or
the selected compressed representation is found in the second list multiple times.

14. The non-transitory computer-readable medium of claim 13, wherein the instructions include further instructions that, as a result of execution by the second one or more processors, further causes the second computer system to:
as a result of the selected compressed representation being found in the second list multiple times, perform a second-stage resolution by at least iterating through the multiple matches to determine whether any of the multiple matches resolve to a Merkle root of the block.

15. The non-transitory computer-readable medium of claim 13, wherein the computer system is or includes a distributed computer system.

16. The non-transitory computer-readable medium of claim 13, wherein:
the instructions to generate the list of compressed representations of the plurality of transactions include instructions to compute the hash output based at least in part on a cryptographic salt that is associated with the block of the blockchain; and
a different block of the blockchain network is associated with a different cryptographic salt.

17. The non-transitory computer-readable medium of claim 13, wherein the list of compressed representations is a list of transaction identifiers corresponding to the plurality of transactions, wherein the plurality of transactions are blockchain transactions.

* * * * *